United States Patent Office.

THEODORE BRINKMANN, OF GREENEVILLE, TENNESSEE.

*Letters Patent No.* 98,022, *dated December* 21, 1869; *reissue No.* 3,881, *dated March* 22, 1870.

IMPROVED FIRE AND WATER-PROOF PAINT AND CEMENT.

The Schedule referred to in these Letters Patent and making part of the same.

*To all whom it may concern:*

Be it known that I, THEODORE BRINKMANN, of Greeneville, in the county of Greene and State of Tennessee, have invented certain new and useful Improvements in Fire and Water-Proof Paint; and I do hereby declare that the following is a full, clear, and exact description thereof.

The nature of my invention consists of the within-described composition for protecting wood-work from the action of fire and from the injurious effects of moisture.

In forming my compound, the following ingredients and proportions are to be observed:

Take one quart of lime, two quarts of sifted river sand cleanly washed and dried. Add two quarts finely-grated home-made cheese, free from fatty particles. The sand, cheese, and lime thus mixed will be finely ground and then incorporated with clabber, coagulated milk free from whey or with water, until the compound is brought to a proper consistency for use.

My compound, when applied in the manner of paint to a roof or entire building, will completely protect it from fire or from the effects of moisture, and being insoluble by water would be preferable to tar for painting the bottom of ships. It will also be valuable for stucco plasterers and molders.

Having thus described my invention,

What I claim, and desire to secure by Letters Patent, is—

A compound for painting roofs and houses when said compound is made in the manner substantially as set forth.

In testimony that I claim the foregoing as my own, I affix my signature in presence of two witnesses.

THEODORE BRINKMANN.

Witnesses:

ELBERT C. REEVES,

ADAM F. NAFF.